April 9, 1968

G. M. MARCOTTE ETAL 3,377,520

LOW DRIFT, HIGH TEMPERATURE SOLION CELLS

Filed July 2, 1965

INVENTORS:
GEORGE M. MARCOTTE
ROBERT S. NORMAN by Richard E. Horley

ATTORNEY

United States Patent Office 3,377,520
Patented Apr. 9, 1968

3,377,520
LOW DRIFT, HIGH TEMPERATURE SOLION CELLS
George M. Marcotte, Tewksbury, and Robert S. Norman, Marblehead, Mass., assignors to General Electric Company, a corporation of New York
Filed July 2, 1965, Ser. No. 469,154
12 Claims. (Cl. 317—231)

ABSTRACT OF THE DISCLOSURE

A low drift, high temperature solion cell has collinearly stacked, spaced electrodes and a redox electrolyte solution in a sealed envelope. Two electrodes define an integral chamber. A platinum-iridium alloy mesh electrode bonded to the envelope by portions thereof interstitially positioned in the mesh is spaced from another, relatively thin and flexible, perforated electrode. Quartz spacers and refractory oxide diffusion barriers provide critical spacing and electrode support.

Background of the invention

The present invention relates to improvements in electrochemical devices of the so-called "solion" type, and, in one particular aspect, to unique and improved solion cells of economical construction which resist deleterious effects of high temperatures and which exhibit high sensitivity and favorable drift-rate characteristics.

As is now well established in the art, phenomena associated with the physically and electrically regulated concentrations and migrations of ions in solution can be advantageously exploited to develop electrical characteristics akin to those more conventionally associated with classical forms of amplifiers, diodes, integrators, and the like. Solion devices based on such phenomena commonly include a number of elements such as electrodes, spacers and barriers hermetically sealed within a glass envelope having a fill of an electrolytic solution in which fully reversible reactions (i.e., comprising a redox system) may take place. One particularly attractive operating mode for these devices involves their functioning as integrators, in which role they incur extremely low drift and power drain. Moreover, although solion integrators are four-electrode (tetrode) assemblies, they lend themselves to fabrication as highly miniaturized units and are capable of performing extraordinarily long-term integrations despite their diminutive proportions. The nature of a typical solion cell is such that the inert envelope (generally glass) confining the electrolyte requires hermetic sealing, and the internal elements must be constructed, arrayed and maintained within very close tolerances; because intense heating is involved in initial fabricating operations, and because relatively high temperatures may also be expected thereafter from extremes of environmental exposures, it is found that there is a high degree of susceptibility to deleterious temperature-induced physical and chemical variations in these precision devices. In the case of porous barrier elements, which commonly comprise Pyrex frits, high temperatures tend to cause obstructions of the needed pores and to distort the barrier and, with it, the abutting electrode surfaces. For the latter reason, relatively thick and stiff cup-like platinum electrodes have been associated with the porous barriers, although attendant problems have arisen because of the tendencies for these costly stiff electrodes to fracture the tightly surrounding glass envelope and to resist the economical fashioning of minute and precise holes which are essential to ionic transfers in the cell. It has further been found that elevated operating temperatures promote contaminations of the solion electrolyte as the result of reactions with the substantially pure platinum, which would normally be expected to remain inert.

Ordinarily, the elevated temperatures encountered during the usual localized sealing of leads with the glass envelope, and during heat-induced shrinking of the envelope about the internal elements of the cell, tend to cause difficulty enough. However, the troublesome tendencies are even more severe when the glass envelope must be heated sufficiently, over a substantial area and time, to become softened, flow between and partly around the strands of the usual gauze-like common electrode, and press strongly toward the readout electrode to reduce electrode spacing in accordance with one of the important aspects of the present teachings having to do with increased cell sensitivity. In resolving related problems of the aforesaid character, the usual porous barrier or divider element or elements are uniquely fashioned of an inert refractory such as alumina, the electrically-conductive parts exposed to the electrolyte are made of a critically-proportioned alloy of platinum and iridium, and at least the shield electrode of this alloy is exceptionally thin and is conveniently needle-punched in a solion integrator structure exhibiting low drift rates.

Accordingly, it is one of the objects of this invention to provide novel and improved electrochemical devices of the solion type which lend themselves to economical fabrication and embody features uniquely promoting stable operating characteristics, improved sensitivity, and substantial immunity to temperature-induced mechanical and electrical disturbances.

Another object is to provide a high-quality solion cell wherein undesirable diffusions into and from minute spaces between the cell envelope and a common electrode are avoided by heat-softened and resulting mechanically bonded surfaces of the envelope and electrode, and wherein non-contaminating porous refractory barrier elements resist distortions and preserve desired porosities.

A further object is to provide solion devices of heightened sensitivity resulting from minimuzed electrode spacings developed by ambient pressures applied via a heat-softened portion of the surrounding envelope.

Still further, it is an object to provide new and improved stable electrochemical cells of the solion type wherein elements fashioned of critically proportioned alloys of platinum and iridium restrain deleterious contaminations of the electrolyte, and wherein very thin perforated electrodes of such alloys avoid thermally-induced failures and promote high sensitivity with low-drift operating characteristics.

Summary

By way of a summary account of practice of this invention in one of its aspects, an improved solion integrator comprises a collinear array of compactly stacked elements of circular outline which are closely fitted within a cup-shaped glass envelope capped by a glass header through which a vacuum may be drawn and an electrolyte introduced prior to final sealing of the cell. The electrolyte may typically comprise potassium iodide and iodine, for example, and is influenced electrochemically by four electrodes which are of a platinum-iridium alloy (about 20% by weight of iridium) and which are stacked in sequence as a common electrode, a readout electrode, a shield electrode and an input electrode. The common electrode, in the form of a flattened wire gauze, is disposed innermost within the cup-shaped portion of the envelope, and has its individual strands or filaments partly embedded in and mechanically bonded to the glass at the bottom of the cup portion, as the result of a localized torch-softening of the bottom from the outside while the assembled unit is evacuated and lacks an electrolyte fill. At this stage of fabrication, ambient atmospheric pressure forces the bottom of the glass envelope inwardly against the common electrode, not only bringing about the aforesaid partial embedment of the common electrode but also pressing the stacked collinear array of elements together so firmly that the space between the common electrode and superimposed readout electrode, occupied only by a thin quartz-paper disk, is advantageously reduced to a very small value. The latter reduction accounts for significantly improved cell sensitivity. Above the readout electrode, and also above the superpositioned shield electrode, are disposed porous sintered alumina disks, located in the barrier and reservoir compartments of the solion. A wire-gauze input electrode at the top of the stack completes the array. At least in the case of the shield electrode, the cup-like structure is of very thin (example: ½ mil.) material, and the necessary ion-flow passageways therein comprise a plurality of flattened needle-punched openings.

Although the aspects and features of this invention which are believed to be novel are expressed in the appended claims, additional details as to preferred practices and embodiments, and as to the further advantages, objects and features thereof, may be most readily comprehended through reference to the following description taken in connection with the accompanying drawings.

*Description of the preferred embodiments*

Figure 1:
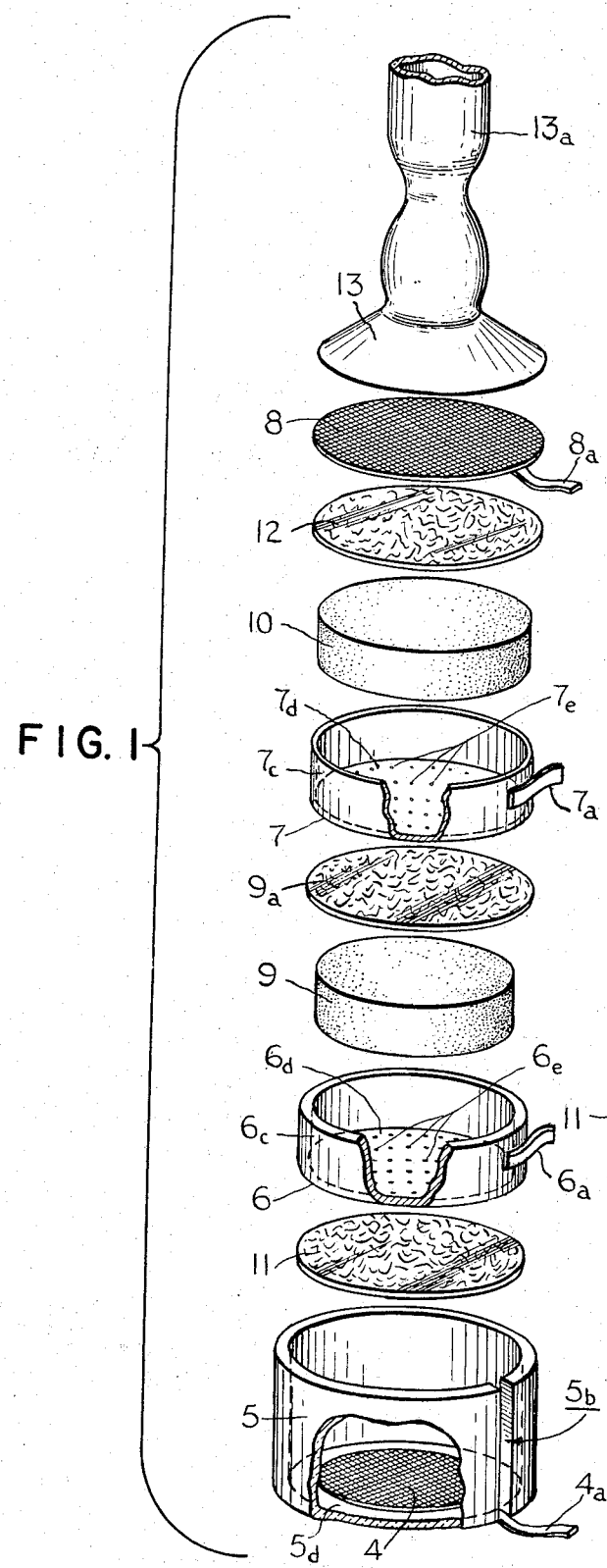
FIGURE 1 portrays the elements of an improved solion integrator cell, in an exploded view.

The structural array represented in FIGURE 1 is of the major mechanical components which may be assembled to form a preferred embodiment of solion integrator in accordance with the present teachings. The usual four electrically-conductive electrodes are involved, specifically, the common electrode 4 (shown positioned against the bottom of a cup-shaped Pyrex glass envelope member 5), readout electrode 6, shield electrode 7, and input electrode 8, collinearly stacked in that order with certain other elements described later herein. When these electrodes and elements are properly packaged within the sealed glass envelope and are fully immersed within its electrolyte filling, such as an electrolyte composed of a known redox system of aqueous solution of potassium iodide and iodine, they are capable of developing highly useful integrations of electrical signals applied by way of the common and input electrodes. More particularly, the electrical input current flowing through the electrolyte between the input (negative) and common (positive) electrodes, via their leads 8a and 4a, respectively, effects a transfer of iodine between a relatively large reservoir zone (appearing between input electrode 8 and perforated shield electrode 7) and a relatively small integral zone (appearing between the perforated readout electrode 6 and common electrode 4), the amount of iodine transferred being proportional to the integral of input current. When a battery and current-sensing device are coupled in series with one another and with the integral zone (i.e. via leads 4a and 6a of the positive common and negative readout electrodes), the sensed output current is proportional to the amount of iodine in the integral zone and, hence, to the integral of the aforesaid input current. The shield electrode, 7, is normally polarized negatively in relation to the input electrode 8, by a battery, for example, to enhance the characteristics of the tetrode as an efficient integrator by opposing unwanted diffusion of iodine from the reservoir zone (between electrodes 8 and 7) to the critical integrator zone (between electrodes 6 and 4). Diffusion barriers 9 and 10, which comprise porous inert insulating members, likewise tend to suppress unwanted diffusions, while also permitting desired electrical paths to be established through the electrolytic solution. Within the integral zone, which is preferably made as thin as possible, iodine is reduced to iodide at the readout electrode 6 and iodide is simultaneously oxidized to iodine at common electrode 4, leaving iodine concentration in that zone unaltered; integration and readout processes may be permitted to occur continuously at the same time.

Figure 2:
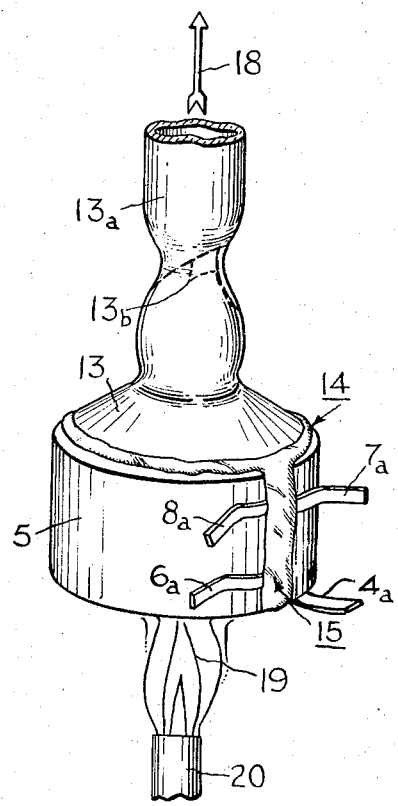
FIGURE 2 depicts an assembled cell, of the type shown in FIGURE 1, at a fabrication stage wherein evacuation and heating automatically effect a reduction of interelectrode spacing and a partial embedment of an electrode within material of the sealed envelope.

In assembling the aforesaid tetrode integrating device, the gauze-like common electrode 4 is first centered atop the bottom of the cup-shaped Pyrex envelope member, with its connecting lead 4a projecting outwardly through the longitudinal wall slot 5b. A thin uniform quartz-paper disk 11, which is to regulate the interelectrode spacing between electrodes 4 and 6, is set in place before the perforated cup-shaped readout electrode 6 is introduced together with the relatively thick and stiff porous diffusion barrier 9. Cylindrical rim 6c of the readout electrode is proportioned to fit closely within cylindrical envelope member 5, and, in turn, is mated tightly with the right-cylindrical barrier member 9. Bottom 6d of electrode 6, which is preferably about 3 mils (0.003″) thick, tends to conform with the abutting planar end of porous disk 9, and a plurality (example: twenty-four) of minute perforations 6e in bottom 6d are provided to enable electrochemical phenomena to occur within the cell. A second quartz paper disk 9a is stacked between porous barrier cylinder 9 and the shield electrode 7 which, like readout electrode 6, has an upstanding cylindrical rim 7c and a plurality of perforations (example: twenty-four) 7e through a substantially planar bottom 7d. Right-cylindrical barrier member 10 mates closely within the shield electrode, and its substantially flat bottom surface abuts against and tends to preserve a planar orientation of the thin bottom (example: about 2 mils) of the cup-shaped shield. A third quartz-paper disk, 12, is interposed between the top of barrier 10 and the input electrode 8. The latter electrode has numerous openings therethrough, and is preferably a gauze or wire-mesh member. Tubular glass header 13 is sealed with the cylindrical envelope member 5 at 14 (FIGURE 2) after the aforementioned elements have been compactly stacked in place. Thin flat electrode leads 4a, 6a, 7a and 8a are also sealed at 15 (FIGURE 2) by melting Pyrex glass in the slot 5b about these leads.

Figure 3:
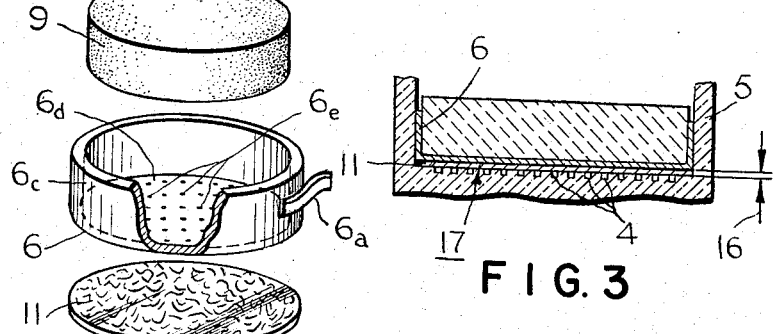
FIGURE 3 is a cross-sectioned side view of a fragment of the completed solion of FIGURES 1 and 2, illustrating the improved relationships existing between the envelope and common and readout electrodes.

Electrical sensitivity of devices of the aforesaid character varies inversely as the square of the interelectrode spacing between the common and readout electrode (i.e. the thickness 16 of the integral chamber 17, in FIGURE 3), and it is thus evident that this spacing should be reduced to as low a value as possible to enhance that characteristic. Inert porous quartz-paper disk 11 aids in preserving the needed electrical insulation between these electrodes while at the same time allowing ionic transportation in the electrolyte which is present in the integral chamber 17 in a small quantity; however, the values of electrode spacings could not heretofore be lowered and held within desired tolerances unless the bottom surface 5d of the Pyrex glass envelope was made very flat and high compressive forces were somehow exerted upon the stacked elements. Collaterally, a further problem has existed because of the so-called "pocket effect," which is the undesirable result of small spaces or pockets appearing between the common electrode and the underlying material of the glass envelope. The latter effect is explained by recognizing that when a positive integrating signal is removed, some of the iodine from the small integral chamber will tend to diffuse into any accessible spaces or pockets behind the common electrode, thus erroneously reducing the values of any readout signals then obtainable; conversely, when a negative signal is applied and then discontinued, the iodine present in the pockets will diffuse into the integral chamber and will erroneously increase the readout beyond what it should be. Both the interelectrode spacing problem and the "pocket effect" difficulty are simultaneously resolved in a simple and highly satisfactory manner by exhausting the cell via the tubular stem 13a and a vacuum pump (symbolized by the arrow 18) and by flame-heating the bottom of the envelope until the latter is sufficiently softened to enable ambient atmospheric pressure to force the soft Pyrex glass tightly against the gauze common electrode and into its interstices. Temperatures of about 900–1,000° C., maintained for a few minutes by the flame 19 of a gas torch 20 (such as an oxygen-hydrogen torch) have been found to produce an adequate red-heat softening for these purposes. Common electrode 4 preferably comprises a flattened-wire mesh, as shown in exaggerated form in FIGURE 3, and the Pyrex glass flowing under force of the existing differential pressure is caused to fill the minute square spaces between the flattened-wire strands, forming a secure mechanical bond with the mesh and avoiding the occurrence of any material voids behind the electrode. However, the glass does not spread across the very top surfaces of the electrode; these top surfaces abut the quartz paper, and, because the softened glass cannot pass this relatively dense paper (which resists the high temperature), it cannot block the intended exposures of the top surfaces of the electrode to the electrolyte in the integral chamber. In prior efforts to avoid pockets, it had been found necessary to utilize cup-shaped glass envelope members having extremely flat bottom inner surfaces, with consequent high cost; however, the improved technique obviates this need. Importantly, the softened glass bottom of the envelope is so strongly forced against the stacked array of elements by the ambient atmospheric pressure that the quartz-paper spacer 11 is, without more, compressed against the bottom of readout electrode 6 and automatically reaches a practical minimum and highly uniform thickness which will nevertheless admit of the presence of a sufficient quantity of electrolyte in the integral chamber to enable successful operation of the device as a solion tetrode. Solion sensitivity, which is in inverse relationship to spacing between the common and readout electrodes, has been remarkably increased about ten times in this manner.

The aforesaid localized torch-heating produces a visible red glow and observable softening and slight movement of the glass. However, the elevated temperatures involved tend to both deform and close up the needed minute pores (creating high internal resistance) of the usual Pyrex-glass diffusion barriers (disposed in the positions of barriers 9 and 10). In part for these reasons, the diffusion barriers 9 and 10 are made of sintered fine particles of a refractory material which is inert within the electrolyte. Alumina particles, compressed and fused at high temperature, to yield a typical porosity of 18–20%, form a highly satisfactory barrier, avoiding reactions with the iodine and the release of free metallic ions which could contaminate the electrolyte and impair proper operation of the cell. Zirconia particles are of like character. With the improved refractory barriers, the desired porosity characteristics remain essentially unchanged and no significant distortions occur, despite the intense heating experienced during cell processing. These barriers are advantageously of relatively low cost, also.

Earlier cell constructions had exploited readout and shield electrodes formed by the sputtering of platinum directly onto surfaces of the porous diffusion barriers. This involved the collateral use of separate rigid annular contacts or collars, disposed for engagement with the sputtered material, but positive electrical contacting was not always assured by this arrangement. Moreover particles of the sputtered platinum could become dislodged and create short circuiting of the integral chamber, for example, and the undesirable formation of $PtI_4$ has also resulted from reaction of the platinum with the electrolyte. Momentary cell surges have also been observed when a large signal was applied, and this has been attributed to double layer capacity, which is much larger on a porous material, such as sputtered platinum, than on sheet material. Distinct fabrication and operational advantages are achieved through the use of the illustrated cup-shaped shield electrode 7 and readout electrode 6. These are preferably fashioned of a platinum-iridium alloy including about 20% by weight of iridium as discussed hereinafter, and are preferably of different thicknesses, which are about one-half mil sheet material in the case of shield 7, and about three-mil thick stock in the case of readout electrode 6. The minute bottom holes, 6e and 7e, allowing for ionic transfer and filling flow through these electrodes, are preferably about four and three mils in diameter, respectively. Drift rate is dependent not only upon the diameter of these holes but also upon their lengths; a somewhat longer path through the holes is desired for the readout electrode, while a shorter path may be used in the half-mil shield electrode while realizing a low drift rate characteristic. The holes in the thicker readout electrode are drilled; however, those in the thinner shield electrode are conveniently and inexpensively punched with a sharp hard needle or needles. In the latter practice, the holes are punched through the less costly half-mil stock while it is rested against a hard-rubber back-up member, and, subsequently, the bottom surface is pressed truly flat; partial closing of the holes in the pressing operation is unobjectionable when allowance is made for the resulting slight constriction of the holes. The shield electrode, particularly, being of such thin stock, remains flexible enough, despite inherent stiffness of the alloy of which it is formed, to avoid tendencies to crack the glass envelope during exposures to high temperatures.

Solions involving substantially pure platinum electrodes are found to be highly susceptible to failures and disturbances, at elevated temperatures particularly, even though it would ordinarily be expected that the platinum would not react sufficiently with iodine or other electrolyte substances to adversely affect the cell operations. One otherwise highly advantageous solion electrolyte which has developed such difficulties when used with platinum electrodes includes 4.37 normal NaI, 0.76 normal KI, and 0.01 normal $I_2$. Such an electrolyte is admitted to the interior of the cell after it is heat-softened in the manner described above, and either fills or nearly fills the cell before the stem 13a is sealed (dotted outline 13b in FIGURE 2). The deleterious effects at elevated temperatures may be attributable to formation of platinum tetraiodide ($PtI_4$) or iodoplatinic acid ($H_2PtI_6$). In some instances, failures could be traced to the formation of a platinum "whisker" between the readout and common electrodes, probably as the result of platinum plating out of solution. Critical percentages of substantially pure iridium, alloyed with substantially pure platinum, are found to yield significantly improved results; specifically a range of about ten and twenty percent by weight of the iridium avoids material contamination of the electrolyte and deterioration of the electrodes, while at the same time providing a workable material which does not have undue stiffness. Comparative data obtained with different electrode materials immersed in the aforesaid electrolyte and aged at elevated temperatures are as follows:

| Material | Time and Temperature | Percent Material Weight Loss | Electrode appearance | Electrolyte appearance |
|---|---|---|---|---|
| 99.99% Pt | 72 hrs. at 85° C. and 2 hrs. at 100° C. | 0.5 | Etched | Very dark, almost black. |
| 99.99% Pt | 72 hrs. at 85° C. and 288 hrs. at 100° C. | 1.3 | do | Do. |
| 90% Pt, 10% Ir | 1,386 hrs. at 100° C | 1.3 | Uniform dull etching. | Dark brown. |
| 80% Pt, 20% Ir | 72 hrs. at 85° C. and 1,275 hrs. at 100° C. | 0 | No significant change. | Light brown. |

Several solions constructed using platinum electrodes failed in less than thirty days of evaluation at 85° C., whereas solions having 20% by weight of iridium alloyed with the platinum have been evaluated in successful operation over a period of 400 days at 85° C. (normal operating conditions would be at about 30° C.).

The present teachings may be applied, when desirable, to solion devices other than the specific integrating tetrode which has been illustrated. It should be understood that the embodiments and practices described and portrayed have been presented by way of disclosure, rather than limitation, and that various modifications, substitutions and combinations may be effected without departure from the spirit and scope of this invention in its broader aspects.

What we claim as new and desire to secure by Letters Patent of the United States is:

1. A solion electrochemical cell comprising:
   (a) a sealed envelope composed of a heat-softenable vitreous material having a range of fusion temperatures,
   (b) a redox electrolyte solution in said envelope,
   (c) a plurality of spaced, stacked electrodes in said envelope in contact with said electrolyte solution, said electrodes each being composed of an alloy of 80% to 90% by weight platinum and 20% to 10% by weight iridium,
      (i) a first of said electrodes being constituted by a relatively thin and flexible member having a planar surface and being perforated by a plurality of minute openings, and
      (ii) a second of said electrodes next adjacent said first electrode defining therewith an integral chamber, said second electrode being formed of a mesh of said alloy, portions of said envelope occupying interstitial positions in said mesh to expose one side of said second electrode to said electrolyte and bond said second electrode to said envelope, and
   (d) a diffusion barrier in said envelope formed of a refractory oxide having a fusion temperature greater than said envelope fusion temperature range and being substantially free of components soluble in said electrolyte solution.

2. A solion electrochemical cell as recited in claim 1, said envelope being tubularly formed of glass, said electrodes being circular, stacked collinearly and composed of an alloy of substantially 80% platinum and 20% iridium, said first electrode openings being distributed, said one side of said second electrode being flattened and parallel to said first electrode planar surface, and said diffusion barrier being cylindrical and formed of compacted, partially fused alumina.

3. A solion electrochemical cell as recited in claim 2, additionally comprising a thin, porous quartz disc compressed against said first electrode by said second electrode to define said integral chamber with small interelectrode spacing, said first electrode being about 0.5 mil thick and being perforated with openings about 3 mils diameter.

4. A solion electrochemical cell as recited in claim 2, wherein said first electrode has a bottom portion with a planar surface and an integral cylindrical rim tightly and coaxially fitted within said envelope, said diffusion barrier being mated within said first electrode to reinforce said bottom portion.

5. A solion tetrode integrator comprising:
   (a) a sealed tubular envelope composed of a heat-softenable glass material,
   (b) a redox electrolyte solution in said envelope,
   (c) four collinearly stacked and spaced-apart electrodes of circular outline within said envelope in contact with said electrolyte solution, said electrodes each being composed of an alloy of about 80% by weight substantially pure platinum and 20% by weight substantially pure iridium,
      (i) a first of said electrodes being constituted by a flattened wire mesh bonded to said envelope by portions of said envelope material occupying interstitial positions in said mesh to expose one side of said first electrode to said electrolyte and bond said first electrode to said envelope, said first electrode thereby constituting a common electrode,
      (ii) a first cup-shaped electrode having a cylindrical rim portion fitted within said envelope and an integral, substantially planar bottom portion having a plurality of uniformly distributed openings therethrough about 3 mils in diameter, said first cup-shaped electrode thereby constituting a readout electrode,
      (iii) a second cup-shaped electrode about 0.5 mil thick having a cylindrical rim portion fitted within said envelope and an integral, substantially planar bottom, having a plurality of uniformly distributed openings of about 4 mils in diameter, said second cup-shaped electrode thereby constituting a shield electrode, and
      (iv) a substantially planar input electrode,
   (d) a first thin porous quartz paper disc compressed against said bottom of said readout electrode by said common electrode to define an integral chamber between said electrodes,
   (e) a first cylindrical diffusion barrier formed of compacted and partially fused alumina, said diffusion barrier being mated within said readout electrode rim portion and contiguous the side of said readout electrode bottom portion opposite said paper disc,
   (f) a second thin porous quartz paper disc separating said shield electrode bottom portion from said first diffusion barrier,
   (g) a second cylindrical diffusion barrier in said envelope of compacted and partially diffused particles of alumina, said second diffusion barrier being mated within said shield electrode rim portion and contiguous said shield electrode bottom portion opposite said second paper disc,
   (h) a third thin porous quartz paper disc between said second diffusion barrier and said input electrode,
   (j) means holding said paper discs, electrodes and barriers in a tightly compacted stack, and
   (k) means for making electrical connections with each of said electrodes extending through said sealed envelope.

6. A solion electrochemical cell comprising:
   (a) a vitreous envelope, (b) an iodine redox electrolyte solution in said envelope, (c) a plurality of spaced electrodes in said envelope in contact with said electrolyte solution, said electrodes each being composed of an alloy of 80% to 90% by weight substantially pure platinum, and 20% to 10% by weight substantially pure iridium, said electrodes thereby resisting deterioration in said electrolyte solution and contamination of said electrolyte solution at elevated temperatures.

7. A solion electrochemical cell as recited in claim 6, wherein said electrolyte solution is an aqueous solution of potassium iodide, sodium iodide and iodine and wherein said electrode material is substantially 80% by weight platinum and 20% by weight iridium.

8. A solion electrochemical cell comprising:
(a) an envelope composed of a vitreous material having a range of fusion-temperatures,
(b) a redox electrolyte solution in said envelope,
(c) a plurality of spaced, stacked electrodes within said envelope in contact with said electrolyte solution, and
(d) a porous diffusion barrier disposed within said envelope between two of said electrodes, said diffusion barrier having a porosity of about 20% and being essentially composed of compacted particles of a refractory metal oxide having a fusion temperature greater than said envelope fusion temperature range and being taken from the group consisting of alumina and zirconia and being essentially free of components soluble in said electrolyte solution, said barrier separating portions of said electrolyte solution in said envelope while permitting diffusion and electrochemical action through the pores thereof.

9. A solion integrator comprising:
(a) a sealed heat-softenable tubular Pyrex glass envelope,
(b) a redox electrolyte solution in said envelope,
(c) a plurality of collinearly stacked and spaced-apart electrodes of substantially circular outline within said envelope in contact with said electrolyte solution and constituting a common, readout, shield and input electrode,
(d) a pair of substantially cylindrical porous diffusion barriers composed of compacted and partially fused alumina, one of said barriers being disposed between said readout and shield electrodes and the other of said barriers being disposed between said shield and input electrodes.

10. A solion electrochemical cell comprising:
(a) a vitreous heat-softenable envelope having an end wall,
(b) a redox electrolyte solution in said envelope, and
(c) a plurality of spaced metal electrodes within said envelope in contact with said electrolyte solution, one of said electrodes being formed of a mesh material partially embedded in said envelope end wall by portions of said envelope material occupying interstitial positions in said mesh to expose one side of said one electrode to said electrolyte solution and bond said electrode to said envelope.

11. A solion electrochemical cell as recited in claim 10, wherein said plurality of electrodes constitute a common, a readout, a shield and an input electrode, said end wall and said one electrode being substantially planar and said one electrode constituting said common electrode, and wherein a second of said electrodes includes a substantially flat perforated electrode substantially parallel to and spaced from said common electrode to define therewith an integral chamber, said second electrode constituting a readout electrode, said cell additionally comprising a thin quartz paper member compressed between said readout and common electrodes for spacing said common and readout electrodes.

12. The method of manufacturing a solion electrochemical cell comprising the steps of:
(a) assembling a plurality of metal electrodes in compactly stacked relationship with insulating spacing members spacing said electrodes within a heat-softenable vitreous envelope, one of said electrodes being in the form of a mesh and disposed contiguously to an end wall of the envelope,
(b) sealing the envelope,
(c) applying heat locally to said envelope end wall to soften the glass thereof, and
(d) reducing the gas pressure within the sealed envelope simultaneously with the application of heat until the heat softened glass of the wall substantially fills the interstices of the mesh to mechanically bond the mesh with the wall and also compress the stacked electrodes and spacer members.

References Cited
UNITED STATES PATENTS

| | | | |
|---|---|---|---|
| 2,685,025 | 7/1954 | Rost | 317—230 |
| 3,021,482 | 2/1962 | Estes | 317—230 |
| 3,163,806 | 12/1964 | Estes et al. | 317—231 |
| 3,273,025 | 9/1966 | Broadley | 317—231 |

JAMES D. KALLAM, *Primary Examiner.*